(12) United States Patent
Strautmann et al.

(10) Patent No.: US 10,401,867 B2
(45) Date of Patent: Sep. 3, 2019

(54) AUTONOMOUS VEHICLE, IN PARTICULAR FEED MIXING VEHICLE, AND METHOD FOR CONTROLLING AN AUTONOMOUS VEHICLE

(71) Applicant: B. Strautmann & Söhne GmbH U. Co. KG, Bad Laer (DE)

(72) Inventors: Wolfgang Strautmann, Bad Laer (DE); Johannes Marquering, Hilter (DE); Andreas Trabhardt, Osnabrück (DE)

(73) Assignee: B. Strautmann & Söhne GmbH u. Co. KG, Bad Laer (DE)

(*) Notice: Subject to any disclaimer, the term of this patent is extended or adjusted under 35 U.S.C. 154(b) by 157 days.

(21) Appl. No.: 15/527,654

(22) PCT Filed: Nov. 17, 2015

(86) PCT No.: PCT/EP2015/002292
§ 371 (c)(1),
(2) Date: May 17, 2017

(87) PCT Pub. No.: WO2016/078757
PCT Pub. Date: May 26, 2016

(65) Prior Publication Data
US 2017/0364089 A1  Dec. 21, 2017

(30) Foreign Application Priority Data

Nov. 18, 2014 (DE) .................. 10 2014 116 882
Sep. 30, 2015 (EP) ............................. 15187603

(51) Int. Cl.
*A01F 25/20*  (2006.01)
*G05D 1/02*  (2006.01)
*A01K 5/00*  (2006.01)

(52) U.S. Cl.
CPC ....... *G05D 1/0274* (2013.01); *A01F 25/2027* (2013.01); *A01K 5/001* (2013.01);
(Continued)

(58) Field of Classification Search
CPC .................. G05D 1/0274; A01F 25/2027
See application file for complete search history.

(56) References Cited

U.S. PATENT DOCUMENTS 8,553,942 B2 * 10/2013 Lynch ...................... G01C 3/00
                                                                    382/106
9,043,072 B1 *  5/2015 Tisdale .................. G05D 1/021
                                                                    701/28
(Continued)

FOREIGN PATENT DOCUMENTS

DE       102012107508 B3    2/2014
EP           2232982 A1     9/2010
(Continued)

OTHER PUBLICATIONS

Deutsches Patent—Und Markenamt (German Patent and Trademark Office), Search in related application, Jul. 27, 2015.
(Continued)

*Primary Examiner* — Jess Whittington
(74) *Attorney, Agent, or Firm* — Laurence P. Colton; Smith Tempel Blaha LLC

(57) ABSTRACT

A method for autonomously controlling a feed mixing vehicle, a vehicle having an autonomous controller, a computer program for carrying out the method, and a control device. The vehicle has a chassis, working elements for carrying out partial tasks, scanners/sensors for transmitting data, and a computer for controlling all the processes. The scanners/sensors acquire spatial data of the surroundings and generate therefrom a 3D map of the current geometry of the surroundings. The current geometry of the surroundings is
(Continued)

placed in relationship with an area that is released to be traveled on by the autonomous vehicle, with the result that the navigability of the travel path of the autonomous vehicle is checked, and in the case of detected non-navigability the travel path is adapted autonomously to the requirements of the situational spatial surroundings and is replaced by an alternative travel path.

13 Claims, 8 Drawing Sheets

(52) U.S. Cl.
CPC ........... *G05D 1/024* (2013.01); *G05D 1/0219* (2013.01); *G05D 2201/0201* (2013.01)

(56) References Cited

U.S. PATENT DOCUMENTS

| | | | | |
|---|---|---|---|---|
| 9,383,753 | B1* | 7/2016 | Templeton | G05D 1/0246 |
| 2007/0291130 | A1* | 12/2007 | Broggi | G01S 17/023 |
| | | | | 348/218.1 |
| 2010/0063680 | A1* | 3/2010 | Tolstedt | G05D 1/0214 |
| | | | | 701/41 |
| 2010/0326363 | A1* | 12/2010 | Van Den Berg | A01K 1/105 |
| | | | | 119/57.92 |
| 2011/0010033 | A1* | 1/2011 | Asahara | G05D 1/024 |
| | | | | 701/26 |
| 2012/0046820 | A1* | 2/2012 | Allard | B60T 7/22 |
| | | | | 701/25 |
| 2015/0034014 | A1* | 2/2015 | Van Kuilenburg | A01K 1/105 |
| | | | | 119/51.01 |
| 2016/0000035 | A1* | 1/2016 | Steen | A01K 1/01 |
| | | | | 119/57.92 |

FOREIGN PATENT DOCUMENTS

| | | |
|---|---|---|
| SU | 1443851 A1 | 12/1988 |
| SU | 1563625 A1 | 5/1990 |
| WO | 2008118004 A1 | 10/2008 |

OTHER PUBLICATIONS

European Patent Office, Europaischer Recherchenbericht (search in related application), Mar. 7, 2016.
WIPO, International Search Report (in priority application), dated Mar. 9, 2016.
Anonymous, Fahrerloses Transportfahrzeug—Wikipedia, Oct. 16, 2014.
Hummel, B., et al., Vision-based path-planning in unstructured environments, 2006 IEEE Intellignet Vehicles Symposium, Meguro-ku, Japan, Jun. 13-15, 2006, IEEE, Piscataway NJ, US.
Guizzo, Erico, How Google's Self-Driving Car Works, IEEE Spectrum, Oct. 18, 2011.
Russia Patent Office, Search Report (in a related application), May 22, 2019.

* cited by examiner

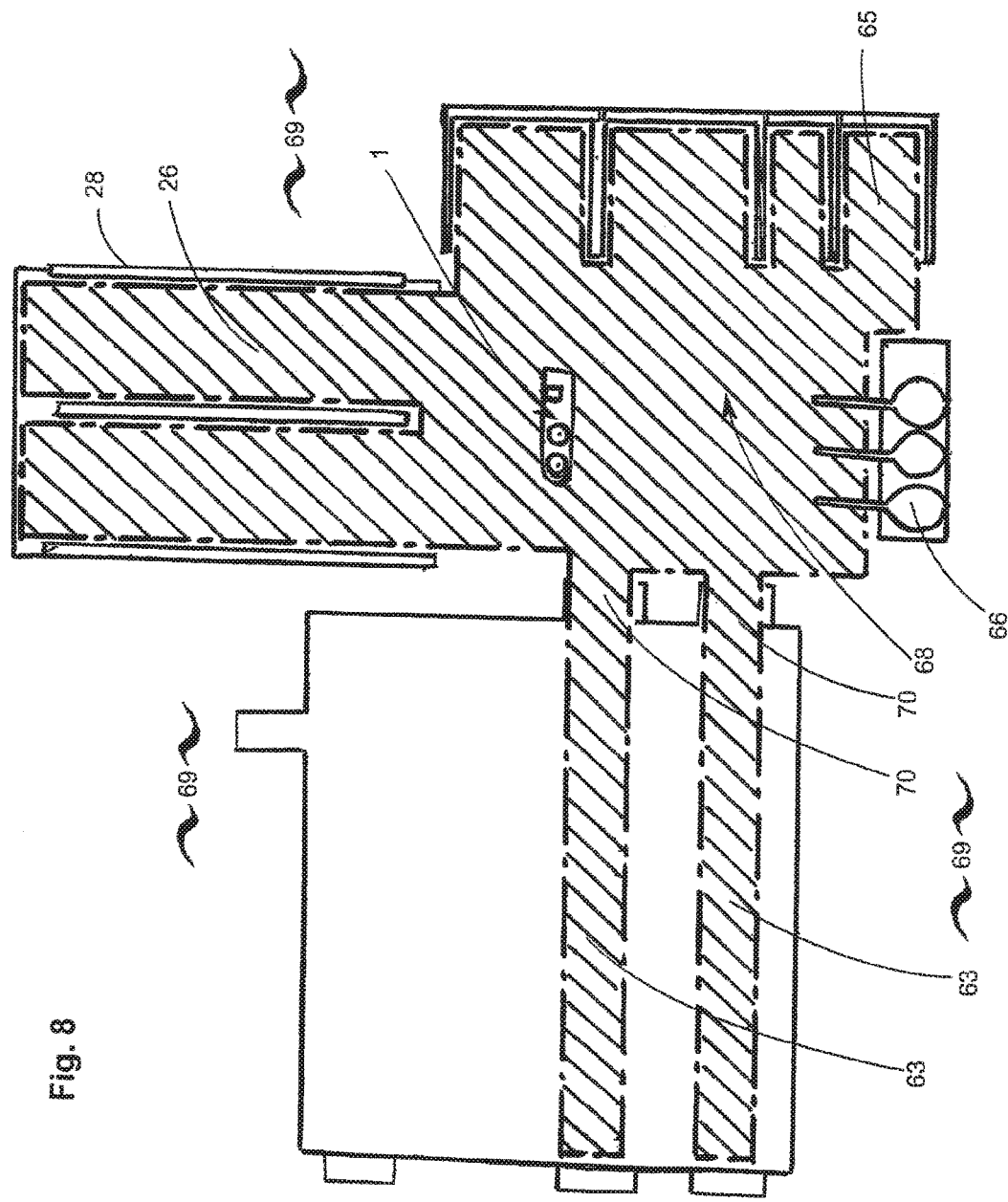

AUTONOMOUS VEHICLE, IN PARTICULAR FEED MIXING VEHICLE, AND METHOD FOR CONTROLLING AN AUTONOMOUS VEHICLE

STATEMENT OF RELATED APPLICATIONS

This application is the U.S. National Phase of International Application No. PCT/EP2015/002292 having an International Filing Date of 17 Nov. 2015, which claims priority on German Patent Application No. 10 2014 116 882.8 having a filing date of 18 Nov. 2014 and European Patent Application No. 15187603.4 having a filing date of 30 Sep. 2015.

BACKGROUND OF THE INVENTION

Technical Field

The invention relates to an autonomous feed mixing vehicle having the following components:
- an autonomously movable and controllable chassis;
- working elements in the form of a drive engine, a traction drive and a steering system for the chassis;
- at least one scanner and/or at least one sensor for transmitting data; and
- at least one computer which interacts with the scanners and/or sensors, characterized in that
- the scanner and/or at least one sensor acquires surroundings data,
- the computer determines from the acquired surroundings data a three-dimensional point cloud which maps the surroundings and is composed of individual points, wherein the position of the individual points is defined in each case by a point coordinate, and the point cloud characterizes overall the situational spatial surroundings,
- the position of the location of the autonomous vehicle is sensed and defined as a starting point (S) in the computer,
- the computer determines a travel path between the starting point (S) and a predefined destination point (Z),
- parameters which are predefined in the computer are compared with the point cloud which maps the surroundings, and
- criteria which permit correction of the determined travel path to form a newly calculated travel path are predefined in the computer,
- with the result that the travel path of the autonomous vehicle can be checked for its navigability, and in the case of non-navigability being detected said travel path can be adapted autonomously to the requirements of the situational spatial surroundings and can be replaced by an alternative travel path.

Furthermore, the invention relates to a computer program product for carrying out the described method, to a corresponding control device for carrying out the described method and/or for executing the described computer program product, and to an autonomous feed mixing vehicle for carrying out the described method.

The autonomous feed mixing vehicle comprises essentially:
- an autonomously movable and controllable chassis;
- working elements in the form of a drive engine, a traction drive and a steering system for the chassis;
- at least one scanner and/or sensor for transmitting data; and
- at least one computer which interacts with the scanners and/or sensors.

Prior Art

Autonomous vehicles are used in different technical fields. For example, in this context reference is made to agricultural vehicles in the field of feeds technology, in particular feed mixing vehicles. Such feed mixing vehicles additionally generally comprise, in addition to the assemblies already mentioned, a mixing container, a discharge device for feedstuffs and a weighing device for the quantity of feed to be received. In addition to agricultural feed vehicles, the invention can also be readily used for vehicles which are used in the field of logistics or for autonomous passenger transportation vehicles.

In the text which follows, a feed mixing vehicle is described as an example of an autonomous vehicle. The material which is to be processed and/or conveyed by the feed mixing vehicle is referred to as feed.

Whereas in the field of relatively large scale pig farming and poultry farming use is generally made of stationary automatic methods and systems, in the field of dairy farming and the raising of feed cattle vehicle-based automated feed methods are known in which all the working processes ranging from the extraction of feed from storage facilities to the production of a predefined feed mixture and the delivery of the feed in a feeding process are carried out autonomously.

For vehicle navigation, that is to say the driving of the autonomous vehicle to the storage facility, feeding point, etc., for example the following techniques are considered for lane guidance:
- inductively: the lane is predefined by one or more wire loops through which an alternating current flows in or on the ground and is detected by means of an antenna or antennas on the vehicle,
- optically: cameras or a similar sensor system, for example laser sensor system which is installed on the vehicle, acquire surroundings data which is used to control the vehicle, and
- in a virtual fashion: the vehicle is guided along a virtual guiding line by means of a position-determining system, e.g. GPS.

The described lane-guidance techniques are also combined with one another to a certain extent. For example, the navigation of the autonomous vehicle or of the feed mixing vehicle as far as the feed store, which may be, for example, an elongated flat silo, can be carried out by means of GPS and by means of an optical system within the feed store.

Specifically for the raising of beef cattle systems are known in which the feedstuffs are firstly made available in what is referred to as a feed cake and are extracted automatically from there and presented to the animals to be fed by means of, for example, a conveyor belt or a gondola system. These systems have the disadvantage that in order to make available the feedstuffs in the feed cake it is necessary to have recourse to non-autonomous methods such as, for example, the extraction of silo bales by means of U block cutters.

As an alternative to this, feeding methods are also known in which, on feed mixing vehicles which are known per se and are controlled by an operator, the manual control operations, ranging from the extraction of feed from a flat silo to the delivery of feed, are controlled independently of the operator, to a partial extent (assistance systems) or even completely (autonomous systems).

Known from US 2010/063680 A1 is a method for controlling an autonomous vehicle and a corresponding vehicle. Here the user first preselects a path and the vehicle then takes this path. The current surroundings data and the position of the vehicle's location are continuously acquired by means of the appropriate sensors and compared with the specified nominal path. Suggested sensors are two-dimensional or three-dimensional LIDAR systems which generate two- or three-dimensional spatial data. Either two-dimensional data sets of different spatial planes are processed into a three-dimensional spatial contour, or the appropriate three-dimensional LIDAR systems are employed for the direct acquisition of three-dimensional surroundings data. The indirectly generated or the directly determined 3D surroundings data can be compared with predefined structures, for example obstacles, and used to generate control commands. With this feature, the vehicle can autonomously correct an initially predefined route.

The disadvantage of this system is the high computing power required for processing 3D data, regardless of whether these 3D data are generated by either 2D or 3D systems.

Also known from the conference transcript published by the Federal Agency for Agriculture and Food, "Innovation Days 2014—New Ideas for the Market", 15 Oct. 2014, XP055287426, Bonn, page 101, is a feed mixing vehicle that employs laser scanners for simultaneous localization and mapping. Here a 2D map is directly generated during the mapping phase.

DE 10 2012 107 508 B3 discloses a method in which a feed mixing vehicle for receiving the feed from a storage facility is firstly directed to a predefined grid point on the flat silo. From this grid point, position data and/or quality data of the feedstuffs to be extracted from the flat silo are determined by means of at least one scanner and/or sensor. The data is received either at the side face of the silo which is provided for the extraction or at an edge face which is already present.

The position data and/or quality data is transmitted to the computer of the feed mixing vehicle and used to define a prioritized extraction point. The prioritized extraction point is the point from which the extraction of feed from the respective storage facility is to be started.

In order to express more clearly that the extraction point specified in DE 10 2012 107 508 B3 is a point which is defined in the X, Y and Z directions and from which the extraction process starts, such an extraction point is referred to below as an extraction starting point.

After the extraction starting point has been determined, the feed mixing vehicle is directed autonomously to this starting point and receives there the feed which is to be loaded. A disadvantage of the proposed method is that the influence of different and also changing peripheral conditions, caused, for example, by different weather conditions such as rain, fog or driving snow, can falsify the quality data and/or position data, determined by the sensors, of the feedstuffs to be extracted.

Furthermore, the securement of a grid point in front of the flat silo can lead to problems since the distance between the grid point and the edge face in the flat silo is increased as feedstuffs are progressively extracted from this silo. The increasing distance can have a negative effect on the determination of data by means of the sensors provided for this purpose, in particular under the influence of the specified weather interference variables.

EP 2232982 A1 discloses a machine and a method for cutting silage which is capable of acting in a largely autonomous fashion. For this purpose, extraction cycles are provided for extracting silage from a storage facility. In a first extraction cycle, the machine is firstly controlled manually by an operator. For this purpose, the feed mixing vehicle is driven into a position from which silage is removed from the storage facility by means of an extraction device provided on the feed mixing vehicle, and is fed into a mixing container also provided on the feed mixing vehicle. After a first manually controlled extraction process has been carried out, the vehicle is directed to a predetermined location. The geometry of the edge face of the silage heap is sensed by means of a scanner from this predetermined location and is stored in a data memory unit. The feed mixing vehicle is then directed to the locations at which the feed located in the mixing container is to be discharged.

The first extraction cycle ends in that the feed mixing vehicle is directed to the predetermined location from which the geometry of the edge face of the silage heap has been sensed during the first extraction cycle.

The second and all the further extraction cycles can be executed autonomously. For this purpose, the geometry of the edge face is firstly sensed again by means of the scanner. The surface structure which is sensed in this way is compared with the data record, stored computer-internally, of the previously sensed structure. Insofar as the deviation between the two mappings exceeds a predetermined value, the systems are switched off and an alarm message is issued. The cause of the deviation may be, for example, that an extraneous body or even an animal or a person is located in the critical area between the feed mixing vehicle and the silo edge face. An operator who is informed by the alarm message can analyze the cause of the disruption and eliminate it and restart the system.

A disadvantage with this system and with this autonomous vehicle is that the intelligence of the system is not sufficient to analyze the cause of the fault to such an extent as to continue the work of the machine without manual intervention by the operator.

BRIEF SUMMARY OF THE INVENTION

The object of the invention is to propose a method which improves the autonomous method of operation of the vehicle. Furthermore, the object of the invention is to propose an autonomous vehicle, in particular a feed mixing vehicle, which comprises means for improving the autonomous method of operation.

This object is achieved by means of a method for controlling an autonomous vehicle, in particular a feed mixing vehicle, from a starting point (S) to a destination point (Z), wherein the autonomous vehicle comprises the following components:
  an autonomously movable and controllable chassis;
  working elements in the form of a drive engine, a traction drive and a steering system for the chassis;
  at least one scanner and/or at least one sensor for transmitting data; and
  at least one computer which interacts with the scanners and/or sensors, characterized in that
  the scanner and/or at least one sensor acquires surroundings data,
  the computer determines from the acquired surroundings data a three-dimensional point cloud which maps the surroundings and is composed of individual points, wherein the position of the individual points is defined in each case by a point coordinate, and the point cloud characterizes overall the situational spatial surroundings, the position of the location of the autonomous vehicle is sensed and defined as a starting point (S) in the computer, the computer determines a travel path between the starting point (S) and a predefined destination point (Z), parameters which are predefined in the computer are compared with the point cloud which maps the surroundings, and criteria which permit correction of the determined travel path to form a newly calculated travel path are predefined in the computer, with the result that the travel path of the autonomous vehicle can be checked for its navigability, and in the case of non-navigability being detected said travel path can be adapted autonomously to the requirements of the situational spatial surroundings and can be replaced by an alternative travel path.

In order to describe the method according to the invention, a differentiation is made below between three types of objects which are located in the space surrounding the autonomous vehicle:

non-moving, static objects such as, for example, buildings, walls and trees;

moving, dynamic objects such as, for example, machines, vehicles, animals and persons; and variable objects such as slidable walls, doors and heaps of feed.

In order to carry out the method according to the invention, the surroundings data is acquired by a scanner and/or another sensor. The computer determines from the acquired surroundings data a three-dimensional point cloud which maps the surroundings and is composed of individual points, wherein the position of the individual points is defined in each case by a point coordinate. The point cloud maps the individual points, determined at a specific point in time, of the static dynamic and variable objects which are required by the scanner and/or sensor.

The instantaneous position of the location of the autonomous vehicle is defined as a starting point in the computer. A travel path between the starting point and a predefined destination point is determined computer-internally. Furthermore, parameters such as, for example, the geometry of the autonomous vehicle, are predefined in the computer. Further parameters can relate, for example, to the surface of the underlying surface to be traveled on, with the result that, for example, any unevennesses which are present, such as for example, potholes in the underlying surface or curbstone edges, can be checked for the possibility of traveling on them. For this checking, the parameters which are predefined in the computer are compared with the point cloud which maps the surroundings. Furthermore, criteria, for example minimum distances, which permit correction of the determined travel path from a newly calculated travel path are predefined computer-internally.

As a result, when the method according to the invention is applied the autonomous vehicle is able to adapt a provided travel path autonomously to situational requirements or to define a new travel path at the destination point and to predefine it to the control assemblies and drive assemblies. The autonomous vehicle is therefore not only able to process individual operating processes autonomously, it instead has a separate intelligence by means of which the operating processes which are provided can be adapted under situationally variable peripheral conditions.

In one preferred refinement of the method according to the invention, a static, three-dimensional map (referred to below as 3D map) of the field of deployment of the autonomous vehicle is stored in the computer. This 3D map is preferably stored on a specific layer, or layer plane, in the computer.

A layer is understood here and below to be a two-dimensional or three-dimensional data space or the mapping of such a data space on a computer.

The geometry data of all the static objects, for example the buildings, any boundary walls of storage facilities or else trees are stored on the static 3D map. The areas in which such immovable devices are present are defined computer-internally as an area which cannot be traveled on, preferably with the inclusion of a safety distance to be defined. On the other hand, the remaining areas can basically be defined as able to be traveled on.

The determination of the position or the localization of the instantaneous position of the autonomous vehicle is preferably carried out by comparing the actual surroundings data acquired by the scanner and/or a sensor with the static 3D map stored computer-internally. In this context, processes in which recorded actual objects are compared with objects stored in the 3D map are provided computer-internally. If the computer identifies, for example on the basis of the spatial data recorded by the scanner or sensor, a volume structure at a distance of 10 meters which is identical to a volume structure which is stored on the static 3D map, for example a building, it can be determined on the other hand that the instantaneous position of the autonomous vehicle is 10 meters away from the position of the building defined in the static map.

Basically, the object localization is also possible if the actual map is acquired with a pure 2D scan system, but the localization is more accurate and unambiguous if the actual data is implemented on the basis of a 3D scan system. As an alternative to a 3D scan system, a 2D scan system can be provided which is modified to the extent that it supplies 3D data indirectly. For this purpose, a 2D scanner, as described below, is subjected to a pivoting movement.

The localization of the autonomous vehicle on the basis of a 3D or modified 2D scan system is defined by a high level of accuracy and permits better compensation of inaccuracies resulting therefrom, for example in the case of non-even movement areas such as, for example, yard areas.

As an alternative to the localization of the autonomous vehicle using a scanner, it is basically also possible to determine the position differently, for example, with a GPS system or by means of induction cables laid in the underlying surface or by means of sensors.

In one advantageous refinement of the method according to the invention, the static, three-dimensional spatial data are compressed to form a plane and are preferably stored on a separate layer plane in the computer. For this purpose, all the Z coordinates of static objects are projected into the X-Y plane in an X-Y-Z spatial coordinate system. The X-Y plane is preferably oriented horizontally. Z coordinates of static objects which are projected into the X-Y plane are therefore no longer defined with respect to their vertical position in the space. This is generally sufficient for the navigation of the autonomous vehicle. It is advantageous here that when a static 2D map with a travel area predefined therein is used the control of the autonomous vehicle and its navigation reduce the requirements made of the efficiency of the computer significantly.

The three-dimensional actual data determined by the scanner and/or at least one sensor and/or the resulting actual map are therefore placed in relationship with a static map which is preferably compressed in a 2D plane. A travel path which is provided on the basis of the static 2D map or the travel area which is permitted to be traveled on is therefore comparable with the actual situation. It can be checked whether the travel path which is provided corresponds to the predefined navigability requirements which are stored in the computer or whether it cannot be traveled on with respect to the current actual situation or the actual map.

It is essential that the autonomous travel path has means which permit the instantaneous position of the autonomous vehicle to be mapped on a static 2D or 3D map and that control processes are provided by means of which the autonomous vehicle can be moved autonomously from the instantaneous position to the desired destination position while taking into account any disrupting objects. In this context, this movement does not have to take place on an accurately defined route but instead merely must not depart from the surface defined as a provided travel area. A correction of an initially pre-planned travel path is necessary whenever the travel path which is pre-planned initially is detected as being incapable of being traveled on on the basis of the current actual situation, for example an object which is in the way.

It is particularly preferred that methods are conceived in such a way that when the non-navigability of the provided travel path is detected on the basis of the stored 2D or 3D map by the computer unit of the autonomous vehicle, alternative paths for reaching the provided destination point (Z) are determined. In this context, different alternative paths which have possibly been determined can be examined according to predefined criteria such as, for example, the time required to reach the destination point. A travel path determined to be optimal on this basis is then used as the basis for the further travel of the autonomous vehicle to the destination point.

As a result of the use of three-dimensional data and, in particular, as a result of the comparison of a static 2D or 3D map with a situation-variable 3D actual map, it is possible to acquire with a high level of accuracy surface data such as, for example, the silage edge face, or obstacles present on the provided travel path such as movable machines or persons, and to control the autonomous vehicle and move the autonomous vehicle autonomously in an overall situation-dependent fashion.

It is particularly advantageous if the checking and re-definition of the travel path are carried out continuously. For this purpose, the surroundings data are determined continuously by the at least one scanner and/or sensor and compared in a computer-internal fashion with stored predefined data.

In one preferred refinement of the method according to the invention a 2D laser scanner is provided as the scanner, which 2D laser scanner can be or is rotated about a yaw angle. The specified yaw angle, referred to in technology also as a roll-pitch-yaw angle is to be understood as a possible way of describing the orientation of an object in the three-dimensional space. Two-dimensional data can be determined in different planes and three-dimensional data can be derived from the two-dimensional data of the different rotational planes by means of a 2D scanner which rotates about the yaw angle. Such a 2D scanner is more cost-effective than a 3D scanner and supplies, when operated in the described way, sufficiently good raw data which can be used as a basis for the three-dimensional mapping of the surroundings.

The 2D scanner can be pivoted through an angle with respect to the ground area or the standing face plane of the autonomous vehicle, with the result that in the case of rotation about the yaw angle at a suitable distance from the scanner a type of focal point is formed. By means of a 2D scanner which is pivoted in this way it is possible, in particular, to identify more easily perpendicular object structures than with scanners that are oriented horizontally.

In one advantageous refinement of the method, 2D data records are determined on the basis of the three-dimensional data in predefined layer planes. These virtual 2D layer planes are preferably oriented horizontally. For example, such a 2D data record can be generated for the three-dimensional space which is relevant for an autonomous vehicle. The area which the autonomous vehicle takes up or travels through as a three-dimensional body is basically relevant. Therefore, basically all the obstacles between the ground and the specified height are relevant for an autonomous vehicle which has, for example, a height of three meters.

In order to determine whether a path which is provided can be traveled on or not, it is sufficient to determine whether an obstacle with a height between the ground (height 0) and the upper edge of the autonomous vehicle (height 3 meters) is present at a width which corresponds to the width of the autonomous vehicle. This determination can be made by projecting all the spatial points between the height 0 and the height 3 meters into a two-dimensional plane. Conversely, if a point is located in the compressed 2D data record, this is the point of a body which must not be traveled over but must instead be traveled around. In order to travel around this point, the next point of a body which is located in the space must be determined on the basis of the specified point. If the distance between the two points is greater than the width of the autonomous vehicle, a passage through which the autonomous vehicle can travel is located between the two points.

The greatest advantage of this computing operation is that no three-dimensional space has to be checked for its navigability in a computer-internal fashion but instead in a first step all relevant points between the height 0 and a predefined value are protected into a two-dimensional plane and in a second step the navigability within this two-dimensional plane is then examined. The quantity of data is reduced significantly as a result of the reduction of the 3D actual geometry data onto a 2D layer plane. As a result, the evaluation speed and therefore the dynamic adaptation of the travel path are increased.

Although basically a very fine calculation which is adapted accurately to the contour of the autonomous vehicle is possible, a somewhat more approximate calculation is generally both sufficient and easier to process for the computer. Therefore, small stones and feed residues which are located on the ground are irrelevant for the determination as to whether this point can be traveled on or not. Against this background, a horizontal plane with, for example, a height of 5 cm can be defined below which determined obstacles are defined as irrelevant for the navigability of the route. In this case, only obstacles which are located at a height of at least 5 cm and at maximum 3 meters generate a point in the compressed 2D map. If, for example, a material which can be, in particular, a feed residue which has a height of 7 cm, is located on the driving route, a non-navigability point is generated in the 2D map and this route is detected as being non-navigable. If the feed residue has a height of only 4 cm, the point is not generated in the compressed 2D map and the route is released basically as a route independently of the feed residue which is present. The obstacle is then traveled over unless an intervention into the control takes place owing to other sensor data. This other sensor data may be, for example, the data of a thermal sensor or magnet sensor, in order to ensure that specific objects, for example small animals or metal parts, are not traveled over even when they do not project into the predefined horizontal plane (5 cm in the described exemplary case).

Furthermore, the definition of safety distances is, of course, possible and also advantageous. For an autonomous vehicle with a width of two meters and a height of 3 meters it is possible, for example, to provide a safety distance of 10 cm in the upward and lateral directions, respectively. If the obstacle is then located at a height of 3.05 meters, this obstacle also generates a point in the compressed 2D map, and the route is classified as non-navigable.

It is therefore detected whether on the provided travel path there are, in the region of the vehicle contour, obstacles which require, preferably dynamic, adaptation of the travel path to the current conditions.

In a further preferred refinement of the method, individual measuring points are compared with objects and/or parameter sets of these objects stored in the computer and classified on this basis. The stored objects may be, for example, side walls, the ground, different feedstuffs, the sky or other known obstacles. As a result of the fact that the objects are identified on the basis of individual measuring points, it is unnecessary to determine the entire 3D data for these objects. The objects can therefore be included in the determination of the travel path without the entire 3D structure which is acquired by the scanner or sensor having to be continuously used as the basis for the calculation.

Furthermore, it is possible to provide that the position information of static objects and/or dynamic objects and/or variable objects are stored in different two-dimensional or three-dimensional data spaces in the computer. The individual data layers can therefore be adapted and managed in a user-friendly fashion. For example, it is possible to adapt the position of different variable objects, such as different heaps of silage or feed supplies, in a situation-related fashion. For example, a silo store which was defined as a corn store in one year can be defined in another year as a grass store. Or a free area can be occupied by a, further, feed supply.

In a further preferred refinement of the method, the autonomous vehicle which is used to execute the method is conceived as a feed mixing vehicle having a device for extracting feedstuff from a storage facility. In this context there is preferably provision that:

the autonomous vehicle comprises an extraction device,
different extraction strategies for controlling the receptacle device are stored in the computer for receiving different feedstuffs;
the structure of the feedstuff in the region of the extraction starting point is determined by means of at least one scanner and/or sensor and compared with structures and/or parameter sets of feedstuffs which are stored in the computer;
an extraction strategy is assigned to the identified structure in the region of the extraction starting point on the basis of predefined criteria, and
the computer actuates the receptacle device with the assigned extraction strategy.

An extraction strategy is to be understood in this context as meaning control of the receptacle device adapted to the respective feedstuff to be received. The receptacle device of the feed mixing wagon can comprise different assemblies such as a cutting plate and/or milling roller and/or conveying roller. The drive of these assemblies is variable. The efficiency of the overall method, that is to say the loading of the autonomous vehicle, in particular of the feed mixing vehicle, with different feed stuffs, is improved if the extraction of a feed stuff takes place with the extraction strategy which is respectively selected for this feedstuff. It may therefore be appropriate, for example, to reduce the extraction speed in the case of feedstuffs which are difficult to extract from the storage facility and to increase it in the case of feedstuffs which are easy to extract.

Furthermore, criteria on whose detection the method for controlling the autonomous vehicle is stopped by means of an emergency off device can be predefined and stored computer-internally. As a result, the operational reliability and the protection against damage and/or failure of the machine are additionally increased.

The application of the method according to the invention also offers advantages within a pen in which the autonomous vehicle, in particular the feed mixing vehicle, is intended to discharge the initially loaded feed. It is therefore possible, for example, for cows located in the pen to be detected, and their position to be included in the control of, for example, the feed.

Furthermore, the scanner which is used can sense whether residual quantities of feed are still present in the feed alley, with the result that the feed ration which is to be discharged can be adapted to the quantity of feed still present.

During the extraction of feed from the storage facility (silo), the entire edge face or the surface structure thereof can be recorded by means of the scanner before the extraction. In this respect, if, for example, broken-off fragments of feed are detected here in the form of a small heap of feed before the actual edge face, the extraction device, which is preferably a milling device which can move up and down, can be controlled in such a way that the milling process for picking up the heap of feed which is located in front is not carried out over the entire height of the storage facility but instead merely in the area in which feed is actually located. Empty runs of the extraction device are therefore avoided.

In contrast to a cyclically occurring extraction process during which the extraction of feed is respectively continued at the point at which it ended during the preceding extraction, such a reference is not necessary during the application of the method according to the invention. The autonomous vehicle, in particular the feed mixing vehicle, can instead drive up to the storage facility, sense the current actual situation and determine therefrom a starting point for the next extraction of feed. It is therefore basically also possible to use a plurality of autonomous vehicles which extract feed independently of one another and feed it to animals.

Furthermore, it is possible to integrate the feeding process into a feed management system. The data about quantities of feed extracted from the storage facilities, in particular data about weight and data about nutrients can be acquired and stored or transferred to an external computer system, for example by radio. On the basis of the geometry data of the silage edge face and the position of this edge face in the storage facility it is also possible to determine the residual quantity of the feed still located in the storage facility and to determine therefrom the temporal range of the feed supply. Insofar as a predefined value is undershot here it is possible to provide that a message is issued to the feed management system, with the result that the operator can take measures which permit the cattle to continue to be supplied with feed after the storage facility has been completely emptied. For example, in such a case another feed store can be integrated into the feeding process.

By applying the method according to the invention it is also possible to optimize the activation of the extraction starting position in the silo. In this context, a first, predefined position is initially assumed which is generally located at such a distance from the storage facility that even when the storage facility is filled the start of the front or first edge area of the storage facility is sensed by the scanner and an extraction starting point which is to be actuated is defined. During the subsequent approach of the autonomous vehicle to the extraction starting point, the position of the extraction starting point is checked from a second position which is more favorable owing to its shorter distance from the measuring point for the determination of data than the first position. The extraction starting point which is determined from the first grid point therefore functions as a type of first reference value on the basis of which the autonomous vehicle approaches the extraction area further.

In this context, with this first reference value it is not yet significant that the determined predefined value is correct in terms of accuracy to a centimeter or even a millimeter. It is only important that the autonomous vehicle can be directed to the extraction starting point at the determination of the first predefined value which is possibly still relatively inaccurate. It is then checked from the second grid point which is provided according to the invention whether the determination of the position of the extraction starting point which was carried out from the first grid point was correct or whether a readjustment is necessary.

It is particularly favorable if, after the checking and redefinition of the extraction starting point the autonomous vehicle is directed from the second grid point to a third, fourth, n-th grid point which is respectively between the grid point which was driven to previously and the previously determined extraction starting point, and wherein in each case a redefinition of the extraction starting point is carried out from the grid point. The computer of the autonomous vehicle therefore determines the extraction starting point iteratively with increasing accuracy from one grid point to another and is enabled to move the autonomous vehicle to the extraction starting point with steering pulses which become ever finer.

In order to be able to use cost-effective sensors and nevertheless determine the extraction starting point precisely, in one simple embodiment of the method according to the invention the traction drive of the autonomous vehicle is stopped when a grid point is reached. The determination of the extraction starting point takes place in this case with an autonomous vehicle which is located in a positionally fixed fashion at the grid point.

In order to reduce the time required for the extraction feed and to increase the overall performance of the autonomous vehicle, in an alternative embodiment the traction drive of the autonomous vehicle is not stopped when a grid point is reached. In this case the extraction starting point is determined dynamically in the case of an autonomous vehicle which is driving at the grid point.

Since the autonomous vehicle approaches the extraction starting point iteratively, the deviations between two successively determined extraction starting points become ever smaller from one redefinition to another. When the distance from the extraction starting point is still small, the deviation usually varies in the millimeter range. However, for disruption-free reception of feed an accurate determination of the extraction starting point within a predefined tolerance range which is larger than the maximum achievable level of accuracy is sufficient. Furthermore, steering movements which are carried out at a short distance from the extraction starting point bring about correspondingly small corrections. It is therefore advantageous if after the determination of the extraction starting point checking and redefinition take place only if the distance between the grid point from which the extraction starting point was determined and the extraction starting point does not undershoot a predefined distance value (x). This predefined distance value is preferably one meter. The predefinition of other distance values, preferably against the background of feedstuff-dependent accuracy requirements, is, however, not ruled out.

The object according to the invention is also achieved by means of a computer program product for carrying out the described method. The computer program product can be produced in any language. It is essential that the computer program product is compatible with computer hardware which is used, and which may be, for example, a PC, a process computer, a tablet computer or a smartphone.

Furthermore, the invention relates to a control device, in particular to a data processing system or a computer, for carrying out the described method. The control device is suitable for executing the computer program.

In particular, the object according to the invention is furthermore achieved by an autonomous vehicle for executing the method according to the invention. An autonomous vehicle is particularly preferred here which is configured as a feed mixing vehicle for feeding livestock. Preferably, the feed mixing vehicle comprises:

an autonomously movable and controllable chassis;
working elements in the form of a drive engine, a traction drive, a mixing container, a discharge device for feed stuffs, a weighing device for the quantity of feed which is to be received, and a steering system for the chassis;
at least one scanner and/or at least one sensor for transmitting data;
at least one computer which interacts with the at least one scanner, in which a 2D laser scanner is provided as the scanner, which 2D laser scanner can be rotated about a yaw angle, with the result that the rotational movement of the scanner makes it possible to determine two-dimensional data in different planes and to derive data of a point cloud which maps the surrounding space in a three-dimensional fashion from the two-dimensional data of the different planes.

A 2D scanner is cost-effective and supplies, when operated in the described way, data which permit the production of a 3D map.

BRIEF DESCRIPTION OF THE DRAWINGS

The invention will be explained in more detail below with reference to the appended drawing and using the example of an autonomous vehicle conceived as a feed mixing vehicle.

FIG. 8 shows the illustration from FIG. 7 with an indication of a surface which is defined as a travel area.

DETAILED DESCRIPTION OF PREFERRED EMBODIMENTS

Figure 1:
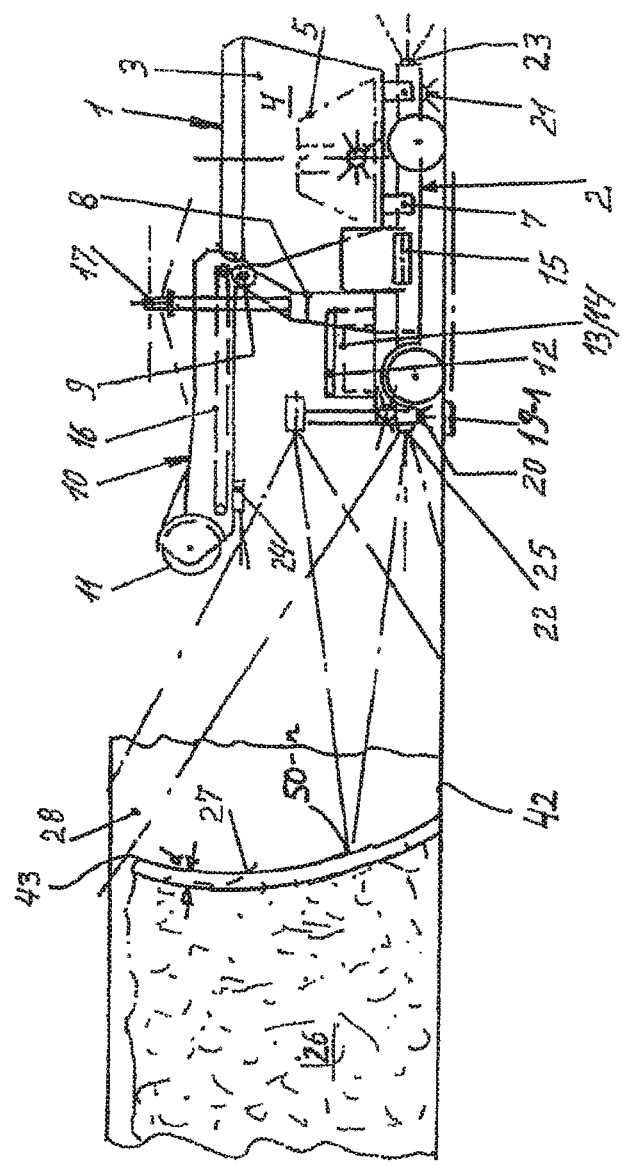
FIG. 1 shows the side view of an autonomous vehicle (feed mixing vehicle) which is positioned at a grid point, during the sensing of the edge face of a flat silo.

Identical or similar elements can be provided with identical or similar reference symbols in the following figures. In addition, the figures of the drawing, their description and the claims contain numerous features in combination. It is clear to a person skilled in the art here that these features can also be considered individually or can be combined to form further combinations which are not described in more detail here.

Figure 2:
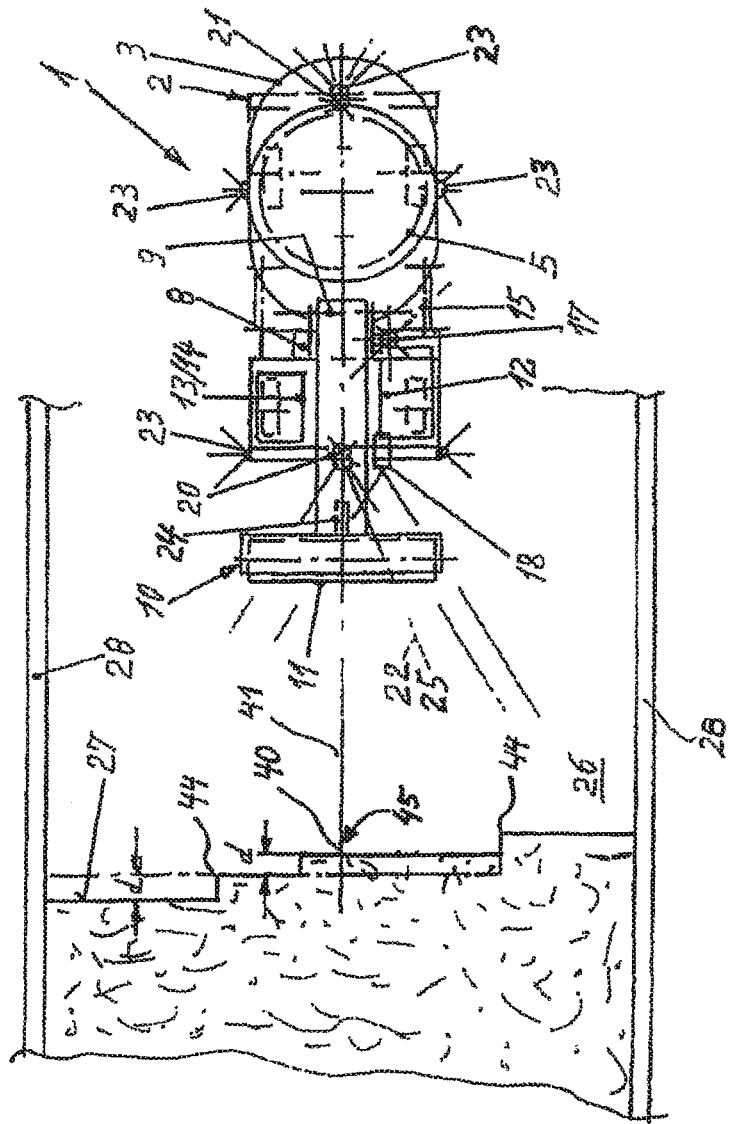
FIG. 2 shows the plan view corresponding to FIG. 1.

FIGS. 1 and 2 show essentially the exemplary design of an autonomous vehicle. The autonomous vehicle is a feed mixing vehicle 1 without a driver's cab for an operator. However, the execution of the method according to the invention is, of course, possible not only on a completely autonomous vehicle but can also be integrated as an assistance system into the control of a vehicle which is equipped with a driver's station.

The type or the purpose of use of the autonomous vehicle or the assemblies which are selected for the execution of partial functions such as extraction of feed, mixing of feed and dispensing of feed are not essential for the method according to the invention. Instead, the control processes or elements, such as the corresponding sensors, which are necessary to realize an at least partially autonomous control process are essential.

These elements permit in a first stage (assistance system) the autonomous control of partial functions, for example the function of "extraction of feed". In a 2nd stage the autonomous vehicle can be configured in such a way that the entire control operation is carried out autonomously, so that it can be used without an operator.

In the text which follows, the exemplary embodiment "feed mixing vehicle" will be described in more detail. In order to detect position quality data of the feed supply for the extraction of feed from the flat silo 26 with the at least partially autonomous feed mixing vehicle 1, the feed mixing vehicle 1 is equipped with sensor-equipped sensing devices such as e.g. scanners and cameras, for controlling the travel elements and operating elements.

The feed mixing vehicle 1 has a chassis 2 which supports, by means of load cells 7 a mixing container 3 in whose mixing space 4 a mixing web 5 is arranged. A supporting frame 8, which supports, on a pivoting axis 9, a receptacle device 10 which is equipped with a milling roller 11 at the outer end and is raised and lowered by means of a hydraulically actuated lifting cylinder is arranged on the chassis 2. As an alternative to the milling roller 11 it is also possible to provide another receptacle device, for example a cutting plate or a combination of a cutting plate and a conveyor roller. In addition, the chassis 2 supports a drive engine 12 for a traction drive and operating elements, a control block 13 and a computer 14, wherein the computer regulates the switching processes of the control unit 13 on the basis of the data determined and transferred by the sensing devices, in accordance with an integrated or separate computer of a weighing device.

Repeating processes are programmed into the memory of the computer 14. The computer 14 can be connected to an external computer of a control station, e.g. via radio, and can be controllable at any time. In order to discharge the feed, the feed mixing vehicle 1 is equipped with a conveyor belt 15. The scanners 17, 20, 21, 22, 23, 24 which are arranged on the feed mixing vehicle 1 permit different tasks to be carried out.

In the exemplary embodiment illustrated in FIG. 1, the lane guidance of the feed mixing vehicle takes place in a partially inductive fashion. In this context, the scanner 20 serves to guide the feed mixing vehicle 1 along a guide rail which is laid in the ground, and positions the feed mixing vehicle at a grid point 19-1 in the region of the flat silo 26. A further scanner 21 serves to assist this task. As an alternative to the illustrated inductive lane guidance, an optical or virtual lane guidance means (e.g. via GPS) is also possible.

In order to provide protection and detection of obstacles in the forward direction, a scanner 22 is arranged whose function is to sense the geometric shape of the end wall or the edge face 27 of the flat silo 26. Laterally arranged scanners 23 serve here not only to detect obstacles but also to measure distances, e.g. from the side walls 28.

A scanner 23 observes the surroundings on the rear side, for safety reasons. A scanner 24 which is arranged at the receptacle device 10 senses the distance from the edge face 27 and determines the data for the definition of the layer thickness d of the feed layer to be milled off. An infrared sensor 25 and/or a thermal imaging camera 18 determine the location of the extraction area and determine the feed quality found there at the edge face 27.

The possibility is not ruled out of the functions which are assigned to the scanners 17, 20, 21, 22, 23, 24 being combined into a reduced number of scanners, in particular a centrally provided scanner 17.

In order to start the autonomous feeding program, the drive engine 12 is started by means of a timer or a signal from the control station, and the feed mixing vehicle 1 is set in motion with a raised receptacle device 10. From its parking station it is initially guided along a guiding line from the scanner 20, wherein further scanners 23 are activated for detection of obstacles.

As an alternative to the navigation along a guiding line, a GPS system 61 or an optical navigation system can also be provided. In the case of the optical navigation system, a scanner 17 or another sensor determines the location of, and identifies, static objects in the sensor sensing range and determines the relative position of the feed mixing vehicle 1 in relation to these static objects. Since the position of the static objects is not variable and in addition is stored in the computer 14, a conclusion about the instantaneous position of the feed mixing vehicle 1 is then drawn computer-internally on the basis of the position of the static object which is stored in the computer 14.

The scanner 17 is a 2D laser scanner which is mounted on the feed mixing vehicle 1 in a position which is inclined by an angle α. The scanner 17 can sense objects within an operating range β of 190°. The scanner is continuously pivoted about the yaw angle. The 2D scanner 17 basically acquires the object data in the plane in which it is oriented at the moment of sensing. In this context, fixed structures are perceived as individual points. The scanner 17 is moved in small time units and angle units and in the process respectively senses objects within the respectively current pivoting plane as points. The individual points of the different sensing planes are transmitted to the computer 14 and combined there to form a three-dimensional point cloud. This three-dimensional point cloud is further processed computer-internally to form a 3D actual map of the space which currently surrounds the feed mixing vehicle.

As an alternative to a 2D scanner 17, a 3D scanner can also be used, which delivers the data required for determining the surrounding space directly, preferably without pivoting of the scanner by the specified yaw angle.

In the exemplary embodiment, the 3D actual map is placed in relationship with a static 2D map which is stored in the computer 14 and in which an area 68 which is released to be traveled on by the feed mixing vehicle is defined.

Figure 4:
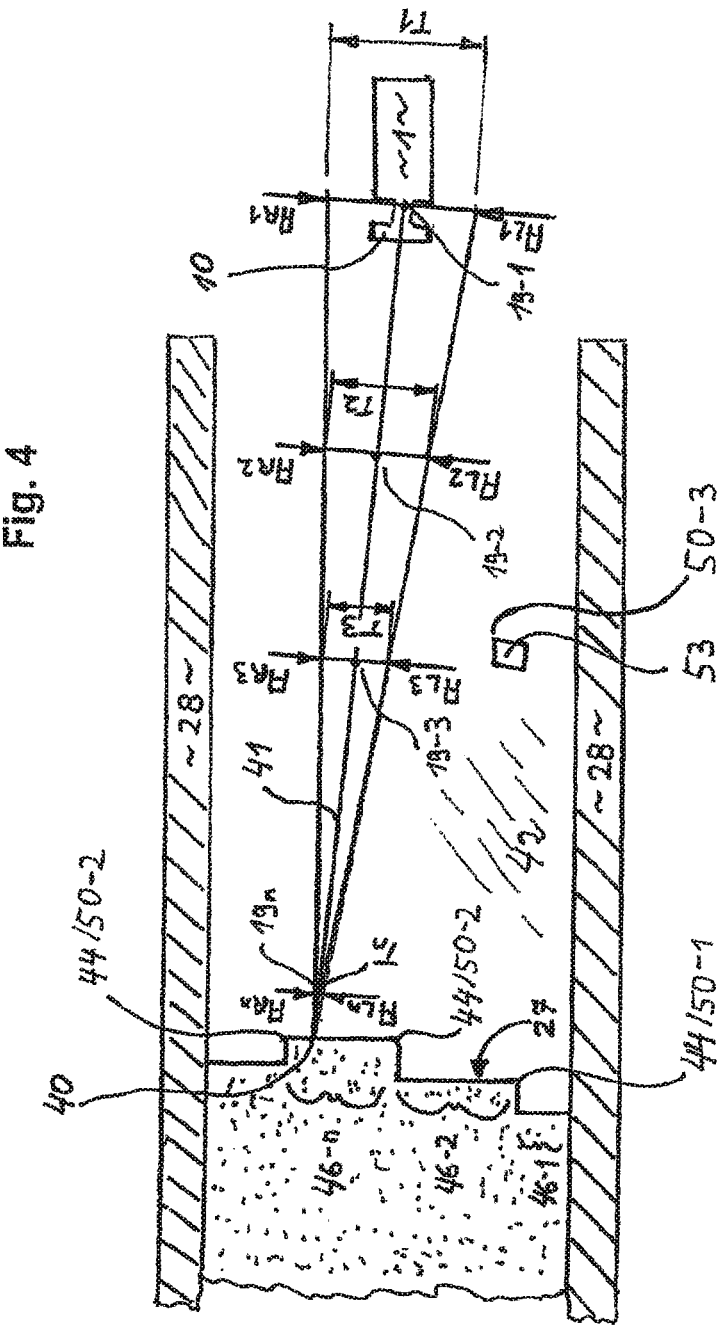
FIG. 4 shows the plan view of an autonomous vehicle positioned at a grid point, in a schematic illustration.

FIG. 4 shows a feed mixing vehicle 1 which has arrived at the flat silo 26 and has been positioned at the grid point 19-1 by means of the scanner 20 in the illustrated exemplary embodiment. In order to be able to navigate the feed mixing vehicle flexibly in the flat silo area, said feed mixing vehicle exits the lane guidance at the grid point 19-1 along a guiding line and changes into a radio direction finding system, e.g. using the already described rotatable 2D scanner 17. The scanner 17 senses the surrounding space, wherein in order to improve the acquisition of data it is possible additionally to arrange specially arranged reflectors in the flat silo area or on existing side walls 28 or the like.

The quality structure of the silage in the form of position quality data is sensed from the grid point 19-1 by means of an infrared scanner 25 and/or an infrared thermal imaging camera 18, and the geometric surface structure at the edge face 27 is sensed by means of a scanner 22, predominantly with a laser design.

The purpose of this determination of data is to define an extraction starting point 40 in the form of a three-dimensional spatial coordinate, which is then driven to autonomously.

In order to define the extraction starting point 40, the following method is preferably applied:

the edge face 27 is examined for the presence of vertical edges 44, if no edges 44 can be identified on the edge face 27, the extraction starting point 40 is defined on a vertical projection line of the edge face 27 whose distance from the side edge of the flat silo 26 or, if appropriate, from a side wall 28 is half as wide as the extraction width of the receptacle device 10, if the vertical projection line 45 intersects a horizontal edge within the edge face 27, an extraction edge of a preceding feedstuff extraction is identified and therefore the intersection point which is found is defined as the extraction starting point 40, if the vertical projection line does not intersect a horizontal edge within the edge face 27, the intersection point between the upper edge 43 of the edge face 27 and the projection line 45 is defined as the extraction starting point 40, if edges 44 can be identified on the edge face 27, a block 46-n which protrudes furthest in the direction of the feed mixing vehicle 1 is identified ("block" is understood in this context to mean the area between two edges 44; cf. FIG. 4: blocks 46-1, 46-2 and 46-n), check the width of the block 46-n, if block 46-n is narrower than the width of the receptacle device 10, place the extraction starting point 40 centrally in front of the block, check whether a horizontal edge is present in the block 46-n if a horizontal edge is present, the intersection point of the horizontal edge and the block center line is set as the extraction starting point 40, if no horizontal edge is present, the intersection point of the upper edge 43 and the block center line is set as the extraction starting point 40, if the block 46-n is wider than the width of the receptacle device 10: identify the edge which is at the shortest distance from the center of the flat silo 26 and set the extraction starting point 40 in such a way that the extraction starts at this edge, and check whether the determined extraction starting point is arranged too close to a wall 28, and if this is the case: correct the position of the extraction starting point 40 in such a way that a collision between the extraction device 10 and the wall 28 during the extraction process is ruled out.

The proposed method can, of course, be modified as a function of external peripheral conditions such as e.g. the design of the flat silo 26 and other feed storage devices. It is essential that a standardized method is configured which as a result defines an extraction starting point 40, to which the feed mixing vehicle can be directed automatically in the further course of the extraction process.

Furthermore, routines for the recognition of foreign bodies 53 as well as strategies for the inclusion of these foreign bodies 53 in the definition of the travel path to the extraction starting point are stored in the travel program.

In order to increase the operational safety an emergency program is provided which, in the event of events which have not been predefined, deactivates all the drive functions and, if appropriate, sends an emergency call to a control station.

Support by means of video camera or via GPS navigation is possible where necessary. The feed mixing vehicle 1 moves from the grid point 19-1 in a targeted fashion to the already determined extraction starting point 40.

In the illustrated exemplary embodiment, the extraction starting point 40 is determined dynamically, that is to say when the feed mixing vehicle 1 is moving. The feed mixing vehicle is moved from the grid point 19-n in the direction of the extraction starting point on a virtual guiding beam 41. After the extraction starting point 40 has been determined for the first time, the extraction starting point 40 is recalculated and, if appropriate, the travel path which is provided is corrected at further grid points 19-2, 19-3, . . . , 19-n at predefined time intervals and/or distance intervals.

FIG. 4 is a schematic illustration of the approaching of the feed mixing vehicle to the extraction starting point 40. At the grid point 19-1, a relatively large tolerance range T1 with a possible deviation to the right AR1 and a possible deviation to the left AL1 is present. That is to say if the feed mixing vehicle were to move from the position 19-1 to the extraction starting point 40 without further readjustment, its actual position could deviate from the ideal position within the tolerance field T1 when the extraction starting point 40 is reached.

When the grid point 19-2 is reached, recalculation of the extraction starting point 40 takes place. Since the distance of the grid point 19-2 from the extraction point 40 is shorter than from the grid point 19-1, a deviation from the ideal guiding beam 41 which is actually of the same magnitude in terms of percentage brings about a reduction in the deviation as an absolute measure. While, for example, the tolerance field T1 at the grid point 19-1 can be plus/minus 10 cm, the tolerance field T2 at the grid point 19-2 is still only plus/minus 8 cm.

A one-off recalculation of the extraction starting point at half the distance therefore brings about a reduction in the tolerance field by 50%. The more frequently a recalculation at further grid points 19-2, . . . , 19-n is carried out, the more accurately the feed mixing vehicle 1 is guided along the guiding beam 41 to the extraction starting point 40, and the smaller the difference between the actual positon of the feed mixing vehicle and the ideal extraction starting point 40 when the extraction starting point 40 is reached. The feed mixing vehicle 1 therefore approaches the extraction point 40 iteratively.

At a predefined distance of the feed mixing vehicle from the extraction starting point 40, the continuous recalculation is set and a program for the likewise automated extraction of the feed by means of the receptacle device 10 is started.

Figure 3:
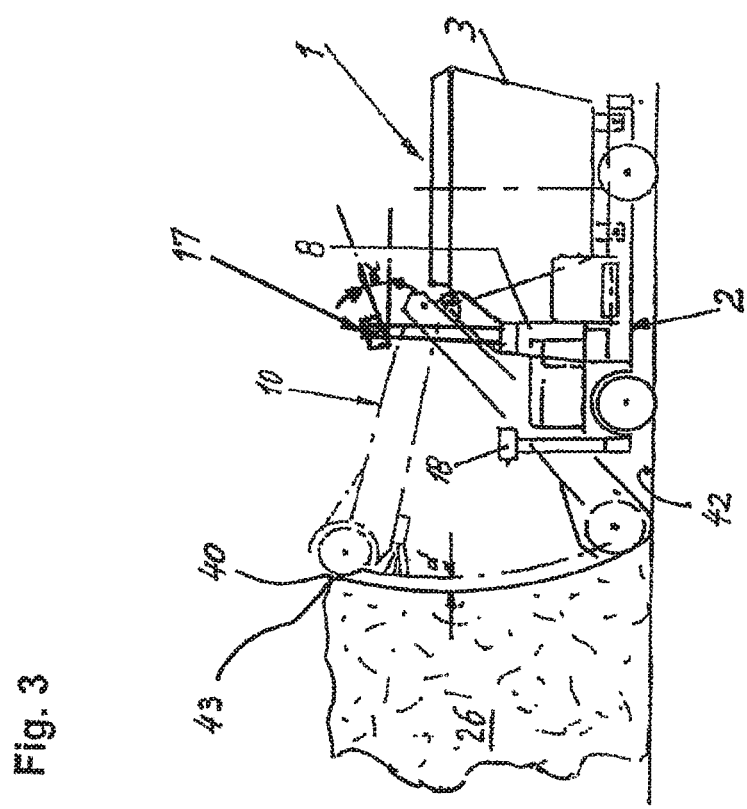
FIG. 3 shows the autonomous vehicle in an operating position.

FIG. 3 shows the feed mixing vehicle after or when it reaches the extraction starting point 40. The extraction starting point 40 is located arranged at the upper edge 43 of the flat silo 26, the receptacle device 10 is guided to the upper edge of the edge face of the flat silo 26, wherein the layer thickness d) of the feed layer to be extracted is determined by means of a scanner 24. If the extraction starting point 40 is not arranged at the upper edge 43 of the flat silo 26 but instead in the area between the ground 42 and the upper edge 43, for example at an edge of a previous feed extraction which is present there, the receptacle device 10 extracts the feed in a targeted fashion from this removal point. When the receptacle device 10 is lowered, the rotating milling roller 11 removes the corresponding layer of feed. The feed is fed to the mixing container 3 by means of a conveyor belt 16 in the shaft of the receptacle device 16.

If the programmed-in weight quantity which is measured by means of load cells 7 is reached in the mixing container 3, this is communicated to the computer 14 by the weighing device, which computer 14 directly outputs the signal to end the extraction of feed.

The feed mixing vehicle 1 subsequently drives e.g. from a grass silo to a grid point on a corn silo, where it also receives a quantity of feed with the known operating steps until the programmed-in weight is reached.

After the extraction of feed from the flat silo, the feed mixing vehicle 1 can again be subject to the control of the already mentioned lane-guided guiding system. If provided, said feed mixing vehicle 1 can be directed to an intermediate station and receive e.g. concentrated feed there. The received types of feed are stored in a feed alley as homogenous mixed feed by means of the conveyor belt 15 after the ending of the mixing process which is brought about by the rotating mixing worm 5.

As an alternative to the illustrated combination of the lane guidance by means of virtual, optical and inductive component elements it is also possible to configure the control in such a way that the lane guidance in the entire system, i.e. in the entire movement space of the feed mixing vehicle, takes place exclusively optically, virtually or inductively.

Figure 5:
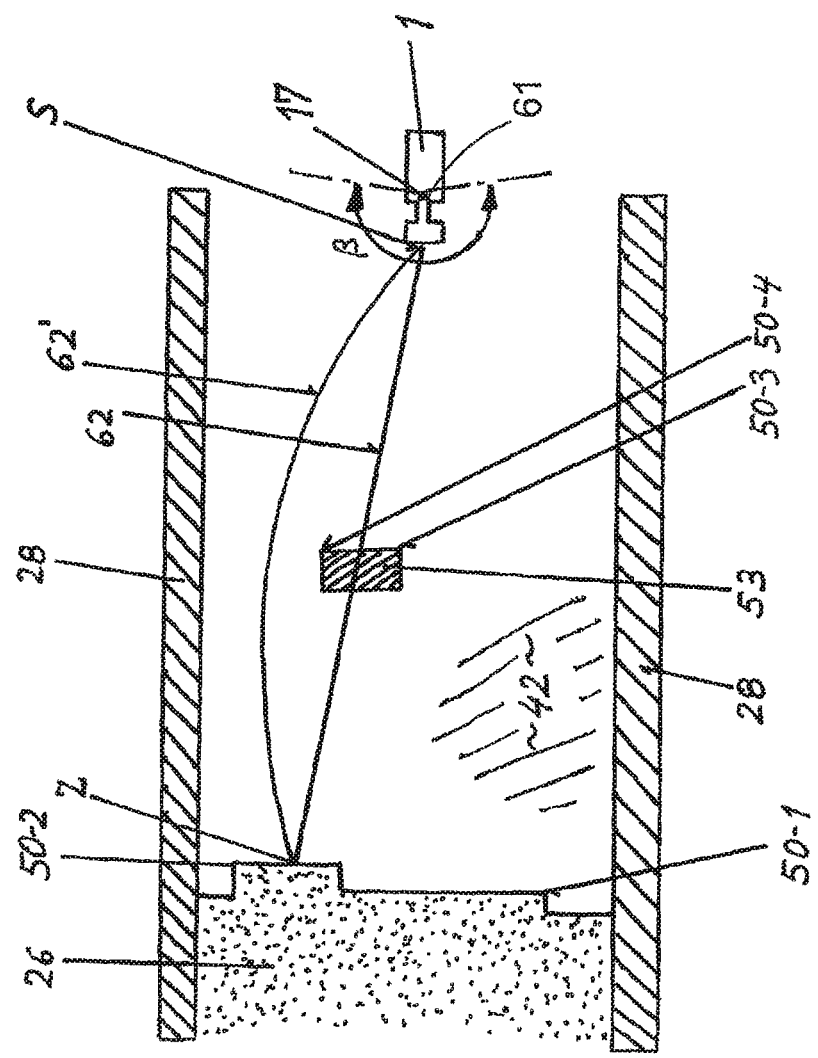
FIG. 5 shows the plan view of an autonomous vehicle in a schematic illustration in conjunction with an autonomously carried-out correction of the driving route.

FIG. 5 shows the autonomous correction of an initially provided travel path 62 to form a travel path 62'. The travel path 62 forms the shortest connection between a starting point S and a destination point Z and therefore basically constitutes a preferred travel path. However, in the situation illustrated in FIG. 5 there is an object 53 on this travel path 62. The scanner 17 determines the coordinates of individual points 50-1, 50-2, 50-n which can be detected in the surroundings. The geometry data of the object 53 comprises, in particular, the corner points 50-3 and 50-4 thereof. The detected object 53 is placed in relationship computer-internally with the one face which is defined as being freely able to be traveled on, the travel area 68 (cf. FIG. 8) and is arranged there.

After the arrangement of the object 53, computing processes for determining an alternative travel path 62' are provided. When the object point 50-4 is compared with the position of the side wall 28 which constitutes a static object which is stored in the static 2D map, it is determined that the distance between the side wall 28 and the object point 50-4 is sufficiently wide for the feed mixing vehicle 1 to pass through. This results in a travel path 62' as a new connecting path between the starting point S and the destination point Z. There is preferably provision that the computer 14 in this way determines not only an alternative travel path 62' but also checks a plurality of potential alternatives and finally selects, on the basis of predefined criteria, a travel path 62' which is determined as optimum.

The determination of the travel path 62' and the control of the continued travel of the feed mixing vehicle 1 on the basis thereof takes place autonomously, i.e. without the intervention of an operator, and in real time. The navigability of the respectively currently provided travel path 62 is checked continuously in a computer-internal fashion and, if appropriate, adapted to form a new travel path 62'.

Figure 6:
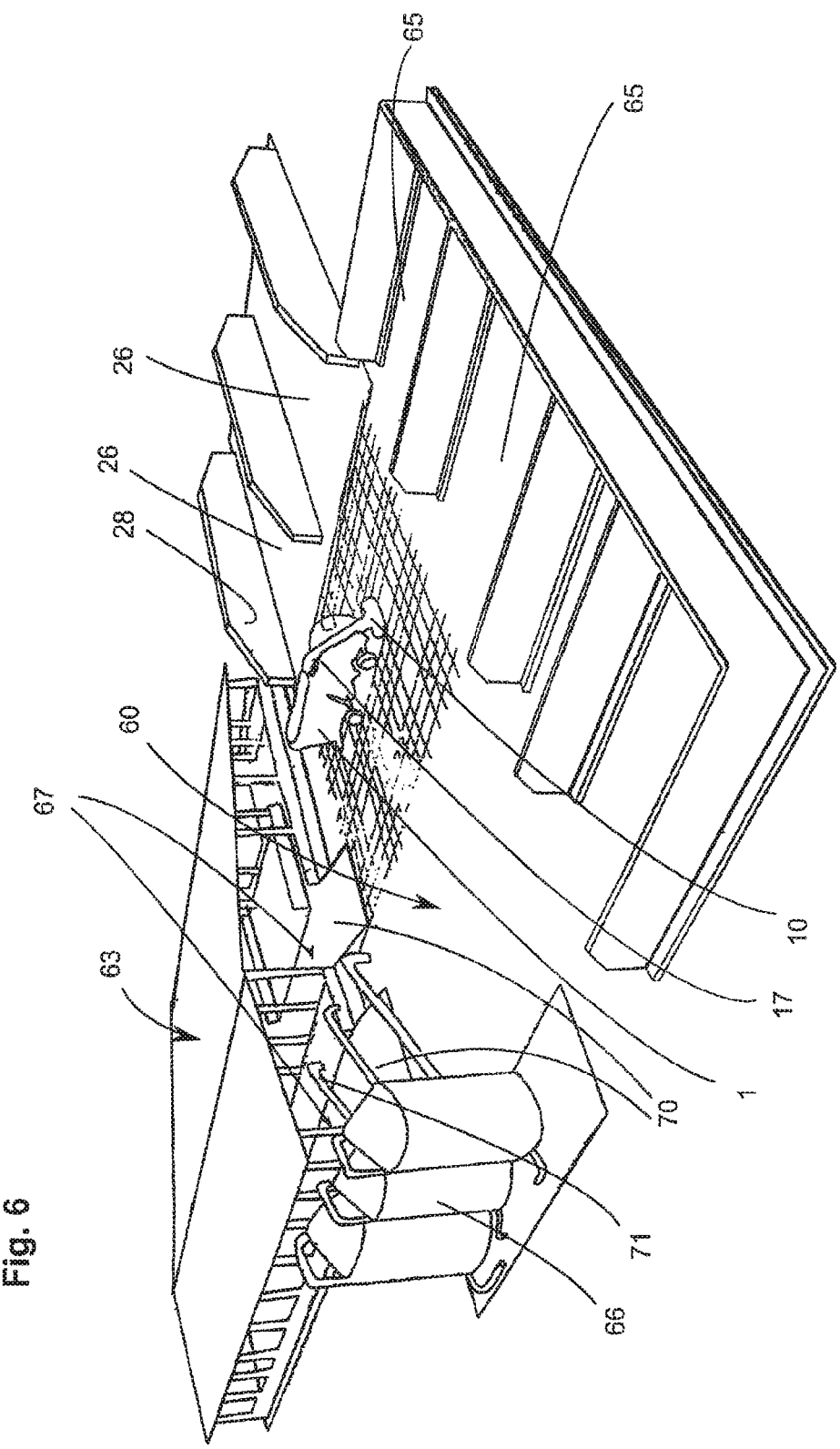
FIG. 6 shows a pen, a plurality of feed storage facilities and an autonomous vehicle in a perspective illustration.

FIG. 6 shows the feed mixing vehicle 1 in exemplary operational surroundings. The feed mixing vehicle 1 is located in a centrally arranged yard area 60. The yard area 60 is surrounded by various feed storage facilities 26, 65, 66 as well as the pen 63. The feed storage facilities are tower silos 66 and mobile silos 26 and 65. In the mobile silos 26, types of ground feed such as grass and corn are preferably stored and the mobile silos 65 serve to receive further feed components, for example soya or brewer's grain. The mixing container 2 is filled either by means of a receptacle device 10 which is provided on the feed mixing vehicle or by means of a filling device which is provided at the feed storage facility, preferably a feed elevator 71 which is mounted on the tower silo 66.

After the feed mixing vehicle 1 has been filled on the basis of predefined recipes, the different components are processed to form a homogeneous mixing feed. The mixing feed is generally stored in the form of a windrow in a feed alley 67 of a pen 63 and offered to the animals in the pen for consumption. The pen or the feed alleys 67 are accessible for the feed mixing vehicle 1 from the yard area 60 via gently rising ramps 70.

Figure 7:
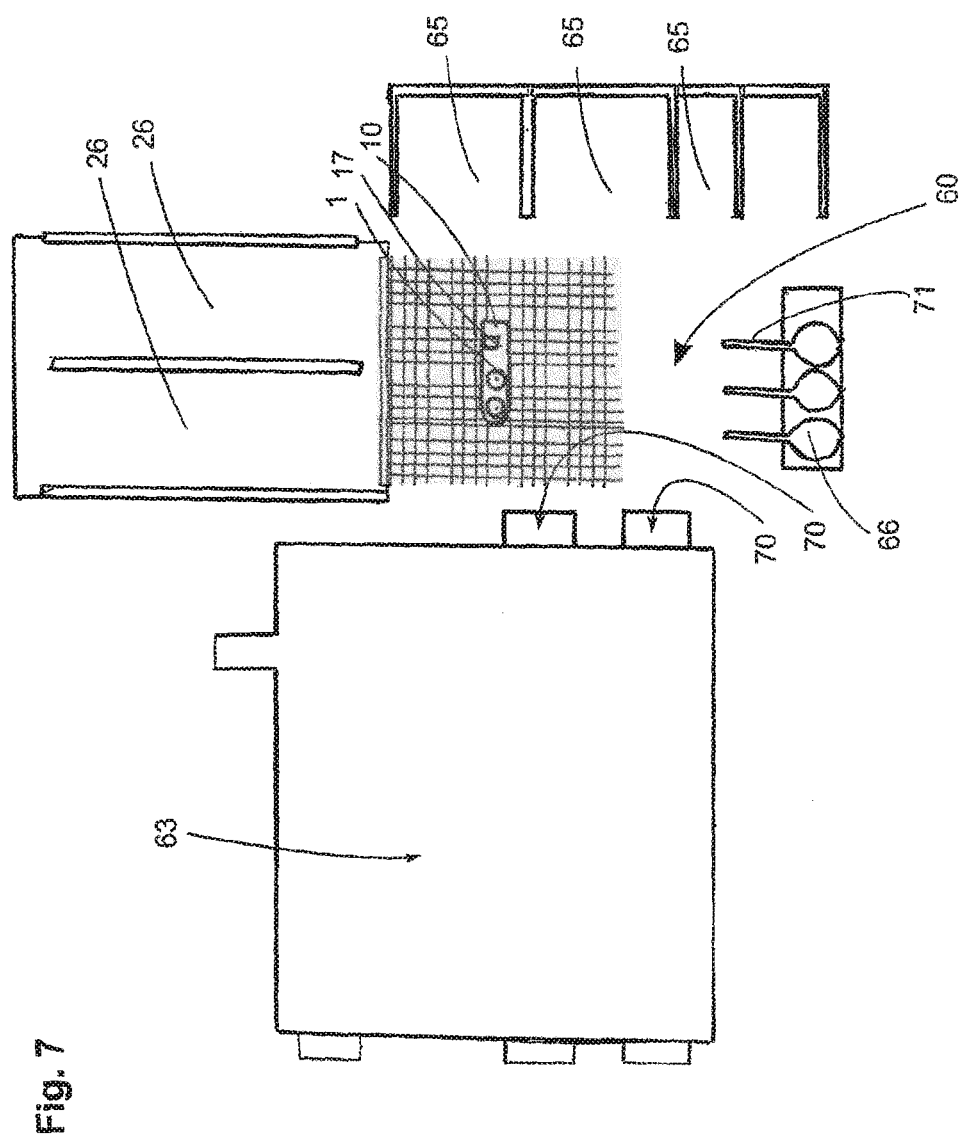
FIG. 7 shows the illustration from FIG. 6 in a plan view.

FIGS. 7 and 8 show a plan view of the devices illustrated in FIG. 6. FIG. 8 additionally illustrates the area 68 which is defined as being freely able to be traveled on by the feed mixing vehicle, and an area 69 which is defined as not being able to be traveled on. The area 68 which can be freely traveled on is stored on the computer 14 of the feed mixing vehicle 1, in a layer which is provided for that purpose. As an alternative to an area 68 which can be freely traveled on, a three-dimensional space which can be freely traveled on can also be stored in the computer 14.

After the conclusion of the extraction operation and/or feeding operation, the feed mixing vehicle 1 drives back to the parking station and waits for the next pre-programmed deployment.

The feed mixing vehicle 1 can be continuously monitored by a control station and controlled from there at any time when necessary. Manual interventions into the control system are, if necessary, possible at any time.

LIST OF REFERENCE SYMBOLS

1 Feed mixing vehicle
2 Chassis
3 Mixing container
4 Mixing space
5 Mixing worm
6 -
7 Load cell 8 Supporting frame
9 Pivoting axis
10 Receptacle device
11 Milling roller
12 Drive engine
13 Control unit
14 Computer
15 Conveyor belt (discharging)
16 Conveyor belt (reception)
17 Scanner (laser scanner)
18 Thermal imaging camera
19-1, 19-2, . . . , 19-n:
   Grid point
20 Scanner (guidance of vehicle)
21 Scanner (rear guidance of vehicle)
22 Scanner (geometric shape)
23 Scanner (detection of obstacles)
24 Scanner (measurement of thickness)
25 Infrared sensor
26 Flat silo
27 Edge face
28 Side wall
29 -
30 -
31 -
32 -
33 -
34 -
35 -
36 -
37 -
38 -
39 -
40 Extraction starting point
41 Guiding beam
42 Ground
43 Upper edge
44 Vertical edge (of edge face)
45 Projection line
46-1, 46-2, . . . , 46-n:
   Block
47 -
48 -
49 -
50-1, 50-2, . . . , 50-n:
   Individual point
51 -
52 -
53 Extraneous body
54 -
55 -
56 -
57 -
58 -
59 -
60 Yard area
61 Sensor (GPS sensor)
62, 62' Travel path
63 Pen
64 -
65 Mobile silo
66 Tower silo
67 Feed alley
68 Face (able to be freely traveled on)
69 Face (not able to be traveled on)
70 Ramp
71 Elevator
72 -
d Layer thickness
T1, T2, . . . , Tn:
   Tolerance field
AR1, AR2, . . . , ARn:
   Deviation on right
AL1, AL2, . . . , ALn:
   Deviation on left
S Starting point
Z Destination point
α Angle (inclination of scanner)
β Angle (operating range of scanner)

What is claimed is:

1. A method for controlling an autonomous feed mixing vehicle from starting point (S) to a destination point (Z) through and about surroundings, wherein the autonomous feed mixing vehicle comprises the following components:
   an autonomously movable and controllable chassis;
   working elements in the form of a drive engine, a traction drive, and a steering system for the chassis;
   at least one scanner and/or at least one sensor for detecting data regarding the surroundings and at least one transmitter for transmitting the surroundings data;
   at least one computer which interacts with the at least one scanner and/or at the least one sensor,
   wherein
   the at least one scanner and/or the at least one sensor acquires the surroundings data,
   the computer determines from the acquired surroundings data a three-dimensional point cloud which maps the surroundings and is composed of individual points, wherein the position of the individual points is defined in each case by a point coordinate, and the point cloud characterizes overall the situational spatial surroundings,
   the position of the location of the autonomous feed mixing vehicle is sensed by the at least one scanner and/or the at least one sensor and is defined as a starting point (S) in the computer,
   the computer determines a travel path between the starting point (S) and a predefined destination point (Z),
   parameters which are predefined in the computer are compared with the point cloud which maps the surroundings, and
   criteria which permit correction of the determined travel path to form a newly calculated travel path are predefined in the computer,
   with the result that the travel path of the autonomous feed mixing vehicle is checked for its navigability, and in the case of non-navigability being detected said travel path is adapted autonomously to the requirements of the situational spatial surroundings and is replaced by an alternative travel path,
   whereby a two-dimensional map of an actual situation of the autonomous feed mixing vehicle relative to the surroundings is determined on the basis of a static, three-dimensional map, through compression of the surroundings data relating to the third plane into a surface, the two-dimensional map and the three-dimensional map being stored in the computer, and the surroundings data which is determined by the at least one scanner and/or the at least one sensor is placed in relationship with the static, three-dimensional map, with the result that the travel path which is provided on the basis of the static, three-dimensional map is compared with the actual situation and it is checked whether the travel path which is provided corresponds to predefined navigability requirements which are stored in the computer.

2. The method for controlling an autonomous feed mixing vehicle as claimed in claim 1, wherein the static, three-dimensional map of the field of deployment of the autonomous vehicle is stored in the computer, and the surroundings data which are determined by the at least one scanner and/or the at least one sensor are placed in relationship with the static, three-dimensional map, with the result that a travel path which is provided on the basis of the static three-dimensional map is compared with the actual situation and it is checked whether the travel path which is provided corresponds to predefined navigability requests which are stored in the computer.

3. The method for controlling an autonomous feed mixing vehicle as claimed in claim 1, wherein in the case of non-navigability of the provided travel path an alternative travel path for reaching the provided destination point (Z) is determined autonomously by means of the computer on the basis of the stored two-dimensional or three-dimensional map and is used to actuate the destination point (Z).

4. The method for controlling an autonomous feed mixing vehicle as claimed in claim 1, wherein the checking of the navigability of the travel path is carried out continuously.

5. The method for controlling an autonomous feed mixing vehicle as claimed in claim 1, wherein the at least one scanner and/or the at least one sensor for transmitting the surroundings data is a 2D laser scanner that is rotatable about a yaw angle, with the result that the rotational movement of the 2D laser scanner allows for a determination of two-dimensional data in different planes and for a derivation of data of a point cloud which maps the surroundings in a three-dimensional fashion from the two-dimensional data of the different planes.

6. The method for controlling an autonomous feed mixing vehicle as claimed in claim 1, wherein position information on static objects and/or dynamic objects and/or variable objects located in the surroundings are stored in different two-dimensional or three-dimensional data spaces in the computer.

7. The method for controlling an autonomous feed mixing vehicle as claimed in claim 6, wherein:
the individual points are compared with the objects and/or parameter sets of the objects stored in the computer; and
the individual points and/or the objects which are identified on the basis of the individual points are included in the determination of the travel path by the computer.

8. The method for controlling an autonomous feed mixing vehicle as claimed in claim 1, further comprising providing a feed mixing vehicle as an autonomous vehicle, wherein:
the feed mixing vehicle comprises an extraction device for extracting feedstuff and a receptacle device for receiving feedstuff;
different extraction strategies for controlling the receptacle device are stored in the computer for receiving different feedstuffs;
the structure of the feedstuff in the region of an extraction starting point is determined by means of the at least one scanner and/or the at least sensor and compared with structures and/or parameter sets of feedstuffs which are stored in the computer;
an extraction strategy is assigned to the identified structure in the region of the extraction starting point on the basis of predefined criteria; and
the computer actuates the receptacle device with the assigned extraction strategy.

9. The method for controlling an autonomous feed mixing vehicle as claimed in claim 1, further comprising stopping the operation of the autonomous feed mixing vehicle upon the occurrence of predefined criteria stored in the computer, wherein the operation of the autonomous feed mixing vehicle is stopped by means of an emergency off device.

10. A computer program product for carrying out a method for controlling an autonomous feed mixing vehicle from a starting point (S) to a destination point (Z) through and about surroundings, wherein the autonomous feed mixing vehicle comprises the following components:
an autonomously movable and controllable chassis;
working elements in the form of a drive engine, a traction drive and a steering system for the chassis;
at least one scanner and/or at least one sensor for detecting data regarding the surroundings and at least one transmitter for transmitting the surroundings data;
at least one computer which interacts with the at least one scanner and/or the at least one sensor,
wherein
the at least one scanner and/or the at least one sensor acquires the surroundings data,
the computer determines from the acquired surroundings data a three-dimensional point cloud which maps the surroundings and is composed of individual points, wherein the position of the individual points is defined in each case by a point coordinate, and the point cloud characterizes overall the situational spatial surroundings,
the position of the location of the autonomous feed mixing vehicle is sensed by the at least one scanner and/or the at least one sensor and is defined as a starting point (S) in the computer,
the computer determines a travel path between the starting point (S) and a predefined destination point (Z),
parameters which are predefined in the computer are compared with the point cloud which maps the surroundings, and
criteria which permit correction of the determined travel path to form a newly calculated travel path are predefined in the computer,
with the result that the travel path of the autonomous feed mixing vehicle is checked for its navigability, and in the case of non-navigability being detected said travel path is adapted autonomously to the requirements of the situational spatial surroundings and is replaced by an alternative travel path,
whereby a two-dimensional map of an actual situation of the autonomous feed mixing vehicle relative to the surroundings is determined on the basis of a static, three-dimensional map, through compression of the surroundings data relating to the third plane into a surface, the two-dimensional map and the three-dimensional map being stored in the computer, and the surroundings data which is determined by the at least one scanner and/or the at least one sensor is placed in relationship with the static, three-dimensional map, with the result that the travel path which is provided on the basis of the static, three-dimensional map is compared with the actual situation and it is checked whether the travel path which is provided corresponds to predefined navigability requirements which are stored in the computer.

11. A control device, namely a data processing system, for carrying out a method and/or for executing a computer program product, for controlling an autonomous feed mixing vehicle from a starting point (S) to a destination point (Z) through and about surroundings, wherein the autonomous feed mixing vehicle comprises the following components:

an autonomously movable and controllable chassis;
working elements in the form of a drive engine, a traction drive, and a steering system for the chassis;
at least one scanner and/or at least one sensor for detecting data regarding the surroundings and at least one transmitter for transmitting the surroundings data;
at least one computer which interacts with the at least one scanner and/or the at least one sensor,
wherein
the at least one scanner and/or the at least one sensor acquires the surroundings data,
the computer determines from the acquired surroundings data a three-dimensional point cloud which maps the surroundings and is composed of individual points, wherein the position of the individual points is defined in each case by a point coordinate, and the point cloud characterizes overall the situational spatial surroundings,
the position of the location of the autonomous feed mixing vehicle is sensed by the at least one scanner and/or the at least one sensor and is defined as a starting point (S) in the computer,
the computer determines a travel path between the starting point (S) and a predefined destination point (Z),
parameters which are predefined in the computer are compared with the point cloud which maps the surroundings, and
criteria which permit correction of the determined travel path to form a newly calculated travel path are predefined in the computer,
with the result that the travel path of the autonomous feed mixing vehicle is checked for its navigability, and in the case of non-navigability being detected said travel path is adapted autonomously to the requirements of the situational spatial surroundings and is replaced by an alternative travel path,
whereby a two-dimensional map of an actual situation of the autonomous feed mixing vehicle relative to the surroundings is determined on the basis of a static, three-dimensional map, through compression of the surroundings data relating to the third plane into a surface, the two-dimensional map and the three-dimensional map being stored in the computer, and the surroundings data which is determined by the at least one scanner and/or the at least one sensor is placed in relationship with the static, three-dimensional map, with the result that the travel path which is provided on the basis of the static, three-dimensional map is compared with the actual situation and it is checked whether the travel path which is provided corresponds to predefined navigability requirements which are stored in the computer.

12. An autonomous feed mixing vehicle, comprising:
an autonomously movable and controllable chassis;
working elements in the form of a drive engine, a traction drive, and a steering system for the chassis;
at least one scanner and/or at least one sensor for detecting surroundings data and at least one transmitter for transmitting the surroundings data; and
at least one computer which interacts with the at least one scanner and/or the at least one sensor,
the autonomous feed mixing vehicle set up for carrying out a method for controlling the autonomous feed mixing vehicle from a starting point (S) to a destination point (Z) through and about the surroundings, wherein the autonomous feed mixing vehicle comprises the following components:
the autonomously movable and controllable chassis;
the working elements in the form of the drive engine, the traction drive, and the steering system for the chassis;
the at least one scanner and/or the at least one sensor for detecting the surroundings data;
the at least one transmitter for transmitting the surroundings data;
the at least one computer which interacts with the at least one scanner and/or the at least one sensor,
wherein
the at least one scanner and/or the at least one sensor acquires the surroundings data,
the computer determines from the acquired surroundings data a three-dimensional point cloud which maps the surroundings and is composed of individual points, wherein the position of the individual points is defined in each case by a point coordinate, and the point cloud characterizes overall the situational spatial surroundings,
the position of the location of the autonomous feed mixing vehicle is sensed by the at least one scanner and/or the at least one sensor and is defined as a starting point (S) in the computer,
the computer determines a travel path between the starting point (S) and a predefined destination point (Z),
parameters which are predefined in the computer are compared with the point cloud which maps the surroundings, and
criteria which permit correction of the determined travel path to form a newly calculated travel path are predefined in the computer,
with the result that the travel path of the autonomous feed mixing vehicle is checked for its navigability, and in the case of non-navigability being detected said travel path is adapted autonomously to the requirements of the situational spatial surroundings and is replaced by an alternative travel path,
whereby a two-dimensional map of an actual situation of the autonomous feed mixing vehicle relative to the surroundings is determined on the basis of a static, three-dimensional map, through compression of the surroundings data relating to the third plane into a surface, the two-dimensional map and the three-dimensional map being stored in the computer, and the surroundings data which is determined by the at least one scanner and/or the at least one sensor is placed in relationship with the static, three-dimensional map, with the result that the travel path which is provided on the basis of the static, three-dimensional map is compared with the actual situation and it is checked whether the travel path which is provided corresponds to predefined navigability requirements which are stored in the computer.

13. The autonomous feed mixing vehicle as claimed in claim 12, comprising:
the autonomously movable and controllable chassis;
the working elements in the form of the drive engine, the traction drive, and the steering system for the chassis; and
the at least one scanner and/or the at least one sensor for transmitting the surroundings data is a 2D laser scanner that is rotatable about a yaw angle, with the result that the rotational movement of the at 2D laser scanner allows for a determination of two-dimensional data in different planes and for a derivation of data of a point cloud which maps the surrounding space in a three-dimensional fashion from the two-dimensional data of the different planes.

* * * * *